US010458750B2

(12) United States Patent
Lee

(10) Patent No.: US 10,458,750 B2
(45) Date of Patent: Oct. 29, 2019

(54) THERMAL WEAPON SIGHT

(71) Applicant: Seek Thermal, Inc., Santa Barbara, CA (US)

(72) Inventor: Jeffrey Lee, Goleta, CA (US)

(73) Assignee: Seek Thermal, Inc., Goleta, CA (US)

( * ) Notice: Subject to any disclaimer, the term of this patent is extended or adjusted under 35 U.S.C. 154(b) by 92 days.

(21) Appl. No.: 15/709,308

(22) Filed: Sep. 19, 2017

(65) Prior Publication Data
US 2018/0100721 A1   Apr. 12, 2018

Related U.S. Application Data

(60) Provisional application No. 62/405,098, filed on Oct. 6, 2016.

(51) Int. Cl.
| | |
|---|---|
| *F41G 1/38* | (2006.01) |
| *H04N 5/33* | (2006.01) |
| *F41G 1/32* | (2006.01) |
| *F41G 3/06* | (2006.01) |
| *G02B 23/12* | (2006.01) |
| *H04N 5/232* | (2006.01) |
| *H04N 17/00* | (2006.01) |
| *F41G 3/16* | (2006.01) |
| *F41G 3/26* | (2006.01) |
| *H04N 5/367* | (2011.01) |
| *G02B 25/00* | (2006.01) |

(52) U.S. Cl.
CPC ............... *F41G 1/38* (2013.01); *F41G 1/32* (2013.01); *F41G 3/06* (2013.01); *F41G 3/165* (2013.01); *F41G 3/2611* (2013.01); *G02B 23/12* (2013.01); *G02B 25/00* (2013.01); *H04N 5/23296* (2013.01); *H04N 5/33* (2013.01); *H04N 5/367* (2013.01); *H04N 17/002* (2013.01)

(58) Field of Classification Search
CPC ..... F41G 1/38; F41G 1/32; F41G 3/06; F41G 3/165; F41G 3/2611; H04N 5/23296; H04N 5/33; H04N 5/367; G02B 23/12
USPC .......................................................... 359/421
See application file for complete search history.

(56) References Cited

U.S. PATENT DOCUMENTS

| | | | | |
|---|---|---|---|---|
| 8,297,173 | B1 * | 10/2012 | Teetzel | F41G 3/165 42/111 |
| 8,656,628 | B2 * | 2/2014 | Jock | F41G 1/30 42/113 |
| 9,113,061 | B1 * | 8/2015 | Morley | H04N 5/23293 |
| 9,906,736 | B2 * | 2/2018 | Patton | G01J 5/10 |
| 2002/0109781 | A1 * | 8/2002 | Asada | H04N 5/232 348/240.1 |
| 2009/0091634 | A1 * | 4/2009 | Kennedy | G02B 23/12 348/217.1 |
| 2012/0167439 | A1 * | 7/2012 | Jock | F41G 1/30 42/113 |

(Continued)

*Primary Examiner* — Frank G Font
(74) *Attorney, Agent, or Firm* — Knobbe, Martens, Olson & Bear, LLP

(57) ABSTRACT

A thermal weapon sight which includes a thermal imaging sensor, associated control and image processing computational elements, and a display includes one or more of improved reticle centering, shot indication and time lapse image capture, digital zoom, contrast enhancement that acts on displayed data only, and device features such as an eyepiece viewing option and controls disposable on a weapon that allow for weapon sight control without moving hands from weapon operation position.

19 Claims, 10 Drawing Sheets

(56) References Cited

U.S. PATENT DOCUMENTS

| | | |
|---|---|---|
| 2014/0110483 A1 | 4/2014 | Benson |
| 2014/0160248 A1* | 6/2014 | Pomerantz .............. G06F 1/163 |
| | | 348/47 |
| 2014/0264020 A1* | 9/2014 | Patton ....................... G01J 5/10 |
| | | 250/330 |
| 2015/0244946 A1* | 8/2015 | Agaian .................... H04N 5/33 |
| | | 348/164 |
| 2016/0169625 A1 | 6/2016 | Richards |

* cited by examiner

THERMAL WEAPON SIGHT

CROSS-REFERENCE TO RELATED APPLICATIONS

This application claims the benefit of U.S. Provisional Application Ser. No. 62/405,098, filed Oct. 6, 2016, entitled "THERMAL WEAPON SIGHT," which is hereby incorporated by reference in its entirety and for all purposes.

BACKGROUND

Field

The present disclosure generally relates to thermal weapon sights and methods of thermal weapon sight operation.

Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced thermal imaging sensors allow for reduced cost thermal weapon sight designs. Such weapon sight designs may benefit from improvements in operation and layout.

SUMMARY

Example embodiments described herein have innovative features, no single one of which is indispensable or solely responsible for their desirable attributes. Without limiting the scope of the claims, some of the advantageous features will now be summarized.

In some embodiments, a thermal weapon sight which includes a thermal imaging sensor, associated control and image processing computational elements, and a display includes one or more of improved reticle centering, shot indication and time lapse image capture, digital zoom, contrast enhancement that acts on displayed data only, and device features such as an eyepiece viewing option and controls disposable on a weapon that allow for weapon sight control without moving hands from weapon operation position.

In a first aspect, a method may be provided for displaying visual content in a weapon sight attached to a weapon, the weapon sight comprising a thermal imager with a processor executing an image processing chain and a display for displaying thermal images to the user of the weapon, including providing a reticle overlaid at a reticle location on the thermal image in the display, wherein the reticle location relative to the thermal image is determined based on an aiming point of the weapon; providing a digital zoom capability to magnify the displayed image beyond an optical magnification; and displaying the reticle at the reticle location in the display corresponding to the aiming point by at least one of: when the magnification is at a level where the magnified image is less than or equal in size to the displayed image, the reticle location is the same in both images; and, when the magnification is at a level where the magnified image is greater in size than the displayed image, the reticle location in the displayed image is offset to the center as closely as possible while maintaining all of the displayed image corresponding to valid pixels from the magnified image.

In some embodiments of the first aspect, the weapon sight comprises a shot indicator, the method further including recording at least one of video and images over a rolling time interval of the thermal image and at least one of storing the recorded video from the interval prior to and/or after the detection of a shot, and storing a predetermined number of images from the interval prior to and/or after the detection of a shot; and displaying at least one of a video, a series of images, or a time lapse video at a user command.

In some embodiments of the first aspect, the zoom levels are 1 to 1 at no zoom, 1 to a predetermined limit of optical zoom, and continuous digital zoom to a predetermined limit past the optical zoom limit. In some embodiments of the first aspect, the continuous digital zoom starts at 1.5 and the reticle position is centered in the displayed image for all values of digital zoom. In some embodiments of the first aspect, the digital zoom increments in magnifying steps of less than 1 to 1.

In some embodiments of the first aspect the image processing chain includes a contrast equalization element, the method further comprising applying the contrast equalization only to the portion of the image displayed when the image is zoomed. In some embodiments of the first aspect the weapon sight further comprises an eyepiece configured to enable viewing of the display by a user with an eye in contact with or in close proximity to the eyepiece.

In some embodiments of the first aspect the weapon sight comprises mating sections and a battery holder configured to release a battery when the sections are un-mated. In some embodiments of the first aspect the weapon sight further comprises a digital zoom control disposable on the weapon configured to allow operation of the weapon and the zoom without changing user hand position. In some embodiments of the first aspect, the thermal imager is a room temperature device comprising a focal plane array comprising an array of microbolometer detectors and read-out electronics.

In a second aspect, a weapon sight may be provided comprising a thermal imager with a processor executing an image processing chain and a display for displaying thermal images to the user of the weapon, the weapon sight configured to, when attached to a weapon: provide a reticle overlaid at a reticle location on the thermal image in the display, wherein the reticle location relative to the thermal image is determined based on an aiming point of the weapon; provide a digital zoom capability to magnify the displayed image beyond an optical magnification; and display the reticle at a position in the display corresponding to the aiming point by at least one of: when the magnification is at a level where the magnified image is less than or equal in size to the displayed image, the reticle position is the same in both images; and when the magnification is at a level where the magnified image is greater in size than the displayed image, the reticle position is the displayed image is offset to the center as closely as possible while maintaining all of the displayed image corresponding to valid pixels from the magnified image.

In some embodiments of the second aspect, the weapon sight further comprises a shot indicator, with the weapon sight further configured to: record at least one of video and images over a rolling time interval of the thermal image and at least one of: store the recorded video from the interval prior to and/or after the detection of a shot; and store a predetermined number of images from the interval prior to and/or after the detection of a shot; and display at least one of a video, a series of images, or a time lapse video at a user command.

In some embodiments of the second aspect, the zoom levels are 1 to 1 at no zoom, 1 to a predetermined limit of optical zoom, and continuous digital zoom to a predetermined limit past the optical zoom limit. In some embodiments of the second aspect, the continuous digital zoom starts at 1.5 and the reticle position is centered in the displayed image for all values of digital zoom. In some embodiments of the second aspect, the digital zoom increments in magnifying steps of less than 1 to 1.

In some embodiments of the second aspect, the image processing chain includes a contrast equalization element and the weapon sight is further configured to apply the contrast equalization only to the portion of the image displayed when the image is zoomed. In some embodiments of the second aspect, the weapon sight further comprises an eyepiece configured to enable viewing of the display by a user with an eye in contact with or in close proximity to the eyepiece.

In some embodiments of the second aspect, the weapon sight comprises mating sections and a battery holder configured to release a battery when the sections are un-mated. In some embodiments of the second aspect, the weapon sight further comprises a digital zoom control disposable on the weapon configured to allow operation of the weapon and the zoom without changing user hand position.

In some embodiments of the second aspect, the thermal imager is a room temperature device comprising a focal plane array comprising an array of microbolometer detectors and read-out electronics.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
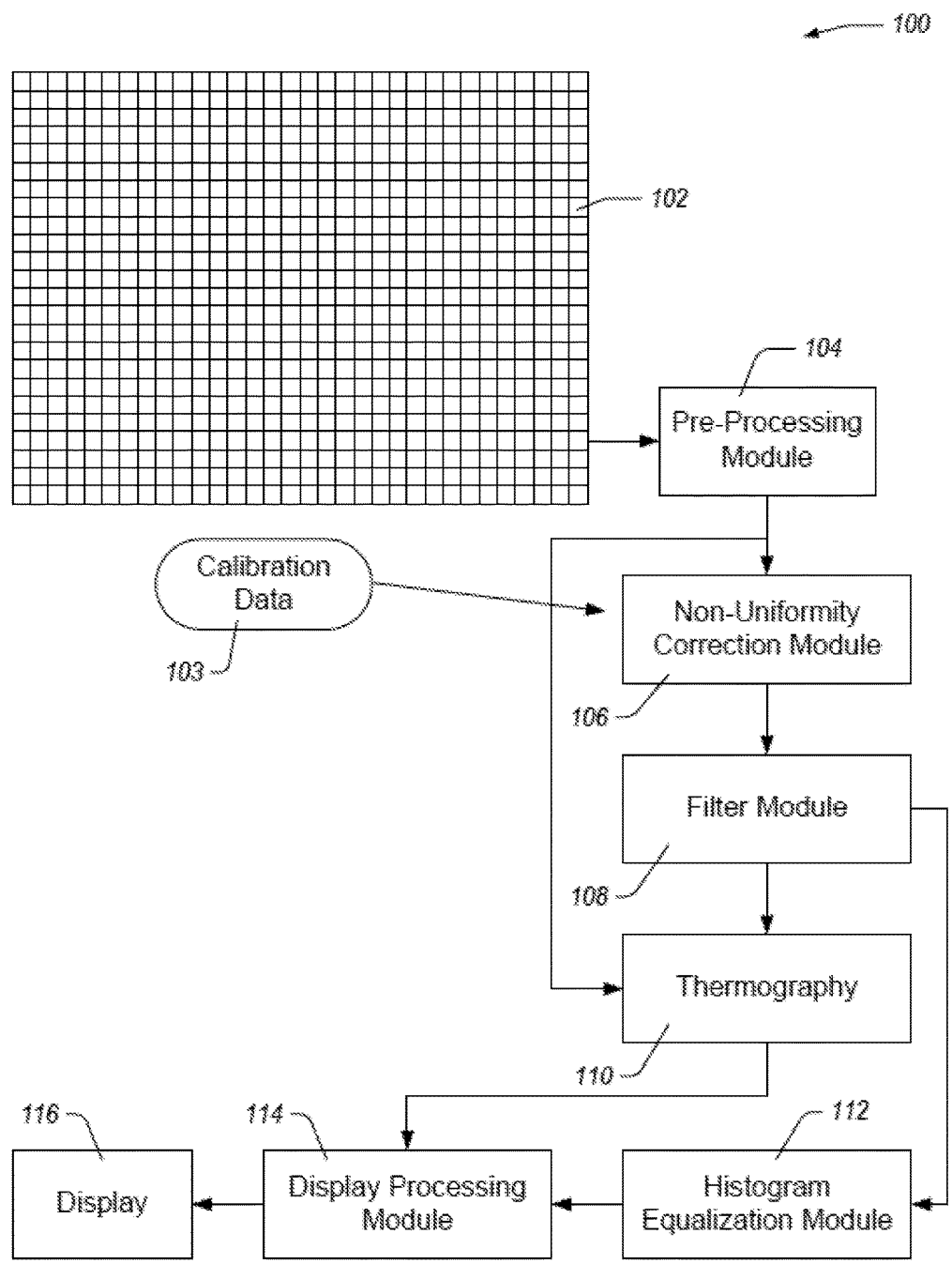
FIG. 1 illustrates a functional block diagram of an example imaging system.

Generally described, aspects of the present disclosure relate to improvements in operation of a thermal weapon sight. These aspects relate to both imaging-related operational improvements as well as physical weapon sight configuration improvements. For example, many weapon sights include a reticle displayed with the image that shows the aiming point of the weapon sight. The reticle may not be centered in the display, for reasons including, for example, one or more of the alignment of the sight relative to the weapon and the actual performance of the weapon as to elevation and windage. Advantageously for a weapon sight with selective image magnification (zoom), the reticle may be more closely centered in the weapon sight display as the image is magnified. Display improvement may be achieved by localizing contrast enhancement to just the displayed portions of magnified images as well. Also for a weapon sight with selectable zoom, the weapon sight may have exterior zoom controls, or other weapon sight control, which may be mountable in a position on the weapon that allows for operation of the controls without moving the operator's hands. A weapon sight may also be implemented with a shot detector such as an accelerometer or a microphone, suitably configured to detect a shot taking place. In some embodiments, a weapon sight with a shot indicator may advantageously record images and/or video of the image for times before and after the shot. A battery operated weapon sight may have a provision for battery removal and installation that is convenient and maintains proper sealing of the weapon sight. An eye piece viewer option may allow an operator to view a weapon sight display in the normal scope position.

Examples and implementations described herein focus, for the purpose of illustration, on a thermal weapon sight based on an imaging system including an infrared camera or sensor using a focal plane array. Various aspects of the disclosure will now be described with regard to certain examples and embodiments, which are intended to illustrate but not limit the disclosure. For many of these aspects, the example embodiments will describe an imaging system where the thermal sensor delivers image data to one or more processors which execute a series of image processing steps, which include the elements for improved weapon sight operation.

Some embodiments described herein provide for a thermal imaging system with digital zoom magnification and reticle centering as the displayed image becomes smaller than the acquired image as the image is zoomed. Advantageously, this may allow for more intuitive operation of the weapon.

Some embodiments described herein provide for applying contrast enhancement to only the displayed portion of a zoomed image. Advantageously, this may allow for higher contrast resolution of the displayed image.

Some embodiments described herein provide for shot detection and capability to record images or videos of the weapon sight image before and after a shot. Advantageously, this may allow for after shot analysis of a shooting event.

Some embodiments described herein provide exterior zoom or other weapon sight controls to mountable where desired on the weapon. Advantageously, this may allow operation of the controls without movement of the operator's hands from the firing position.

Some embodiments described herein provide for an optional eye piece display viewer. Advantageously, this may allow for operation of the weapon sight in the position normal for conventional telescopic weapon sights.

Some embodiments described herein provide for convenient battery installation and removable compatible with a tight sealed weapon sight body. Advantageously, this may allow for an environment proof weapon sight that allows for easy battery exchange even for gloved operators.

The disclosed weapon sight operation methods may be implemented as modules or elements that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In general, digital control functions, image acquisition, image processing, and image display/analysis may be distributed across one or more digital elements or processors. Referring to a system processor or any controller in any of the disclosed embodiments should not be interpreted as implying the control and processing functionality resides in a single element.

As a particular example of some advantages provided by the disclosed systems and methods, a thermal weapon sight can include a thermal imaging focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, $P_{x,y\ signal}$, in the image. These digital words are usually of a length determined by the analog to digital conversion (A/D) process. For example, if the pixel data is converted with a 14 bit A/D, the pixel words may be 14 bits in length, and there may be 16384 counts per word. For a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. A thermal weapon sight will usually display this data on a visual display.

Each pixel in a thermal imaging FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For instance, a microbolometer detector array, a microelectrical mechanical system (MEMS) device, may be manufactured using a MEMS process. The associated ROIC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

Examples of image processing systems and methods are disclosed in U.S. patent application Ser. No. 14/829,500, filed Aug. 18, 2015, U.S. patent application Ser. No. 14/292,124, filed May 30, 2014, U.S. patent application Ser. No. 14/829,490, filed Aug. 18, 2015, U.S. patent application Ser. No. 14/817,989, filed Aug. 4, 2015, and U.S. Pat. No. 817,847, filed Aug. 4, 2015, each of which is incorporated by reference herein in its entirety. These referenced applications describe a variety of imaging system configurations and various techniques for adjusting for artifacts and correcting for degradations in image quality that arise at least in part due to various properties and characteristics of the imaging systems. These various image processing functions may be accomplished in a processing unit or units, which interfaces and controls the operation of the FPA as well as other aspects of the weapon sight. The processing unit(s) may include, for some imaging systems, control functions for operating a calibration element such as a shutter.

Example Imaging Systems

FIG. 1 illustrates a functional block diagram of an example thermal imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. In some embodiments, the read out electronics outputs the data as a stream of a few columns or rows at a time. For instance some FPAs utilize a technique known as an electronic rolling shutter which activates the photodetectors during image acquisition in discrete increments, or sub-frames, of the total frame and outputs the sub-frames as they are acquired accordingly. Thus subsequent image processing may be configured to act on a sub-frame basis, working through the entire frame one or more sub-frames at a time. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit ("ROIC"). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. patent application Ser. No. 14/829,490, entitled "Gain Calibration for an Imaging System," filed Aug. 18, 2015, the entire contents of which is incorporated by reference herein. The calibration data 103 can be stored on the imaging system.

The imaging system 100 includes one or more modules configured to process image data from the focal plane array 102. One or more of the modules of the imaging system 100 can be eliminated without departing from the scope of the disclosed embodiments, and modules not shown may be present as well. The following modules are described to illustrate the breadth of functionality available to the disclosed imaging systems and not to indicate that any individual module or described functionality is required, critical, essential, or necessary. Modules such as non-uniformity correction module 106, the filter module 108, the thermography module 110, and/or the histogram equalization module 112 may be collectively described as an "image processing chain."

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. patent application Ser. No. 14/829,500, filed Aug. 18, 2015, entitled "Adaptive Adjustment of the Operating Bias of an Imaging System," the entire contents of which is incorporated by reference herein.

Bad pixel replacement may be present as well, examples of which are described in U.S. Prov. App'n No. 62/297,669, entitled "Pixel Decimation for an Imaging System," and filed Feb. 19, 2016, the entire contents of which is incorporated by reference herein. Bad pixel replacement functionality, which may include pixel decimation, may have access to a bad pixel map, which may be part of calibration data. In various implementations, bad pixels may be identified within image data by observing if given pixels are outside of pre-determined tolerances or vary from their neighbors by more than pre-determined thresholds.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived from actuation of an in-operation calibration element such as intermittently closing a shutter over the focal plane array 102 to acquire uniform scene data. From this acquired uniform scene data, the non-uniformity correction module 106 can be configured to determine deviations from uniformity. The non-uniformity correction module (NUC) 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter, and may use another type of in-operation element, and may rely on presenting known scenes to the imaging array as opposed to flat-field scenes. Some NUC techniques do not rely on physical calibration elements and use image processing techniques to derive a NUC. These techniques may be used with or in place of physical calibration element techniques. Additional examples of systems and methods for non-uniformity correction are described in U.S. patent application Ser. No. 14/817,847, entitled "Time Based Offset Correction for Imaging Systems," filed Aug. 4, 2015, the entire contents of which is incorporated by reference herein, and U.S. Provisional Pat. App'n No. 62/355,797, entitled "Fixed Pattern Noise Mitigation for a Thermal Imaging System," filed Jun. 28, 2016, the entire contents of which is incorporated by reference herein. Adaptive calibration or shutter control may include elements present in the pre-processing module 104 or equivalent, as well as parts of the image processing chain as described in U.S. patent application Ser. No. 15/068,405, entitled "Time Based Offset Correction For Imaging Systems And Adaptive Calibration," filed Mar. 11, 2016, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. patent application Ser. No. 14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like. For the case where pixel decimation with bad pixel replacement is desired, the bad pixel functionality may be placed earlier in the chain.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. patent application Ser. No. 14/956,111, entitled "Image Adjustment Based on Locally Flat Scenes," filed Dec. 1, 2015, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter, and/or a bandpass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace specific pixel data, as opposed to wider image area data, with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. patent application Ser. No. 14/817,989, entitled "Local Contrast Adjustment for Digital Images," filed Aug. 4, 2015, the entire contents of which is incorporated by reference herein. Highpass filter and related techniques may be used to detect edge features in an image as well.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. patent application Ser. No. 14/838,000, entitled "Thermography for a Thermal Imaging Camera," filed Aug. 27, 2015, the entire contents of which is incorporated by reference herein.

The image processing system 100 includes a histogram equalization module 112, or other display conversion module (compression modules for example, or combinations of different techniques), configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on scene intensity values where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words, which is related to analog to digital (A/D) conversion resolution. For instance, the A/D sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein. The histogram equalization or other type of contrast enhancement may be applied locally as described in the discussion of FIGS. 5A, 5B and 5C below.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. patent application Ser. No. 14/851,576, entitled "Selective Color Display of a Thermal Image," filed Sep. 11, 2015, the entire contents of which is incorporated by reference herein. The Display Processing Module 114 may also contain or interface to a display driver which converts color table values to actual luminance color values to drive the display 116, such as RGB, yCV etc.

The display 116 can be configured to display the processed image data. The display 116 can also be configured to accept input to interact with the image data and/or to control the imaging system 100. For example, the weapon sight may include zoom or other controls whose actuation may affect the display.

Figure 2:
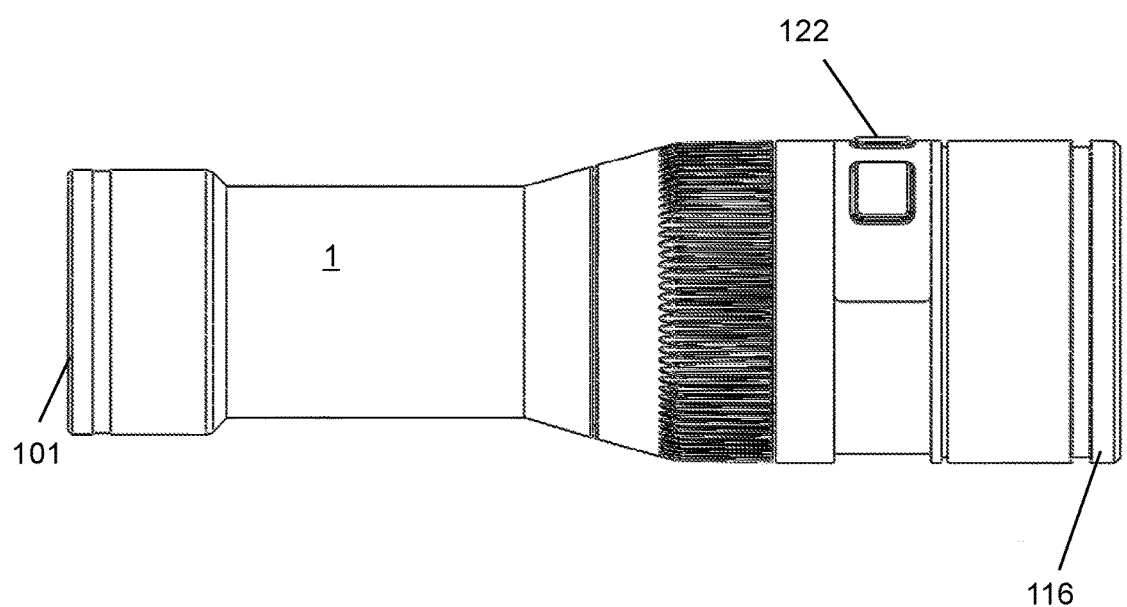
FIG. 2 is an illustrative outline of a thermal weapon sight showing elements of the sight.

The imaging system 100 can be provided as a standalone device, such as a thermal weapon sight 1 as shown in FIG. 2. For example, the weapon sight can include a housing configured to enclose hardware components (e.g., the focal plane array 102, read out electronics, microprocessors, data storage, field programmable gate arrays and other electronic components, and the like) of the imaging system 100 as well as display 116. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components 122 to allow the user to interact with and/or control the imaging system 100. The user interface components can include, for example and without limitation, touch screens, buttons, toggles, switches, keyboards, and the like, although for a thermal weapon sight, buttons may be advantageous.

Although the following disclosure describes a standalone weapon sight, self-sufficient in terms of processing, display, and user interface resources, a weapon sight can equally be configured in accordance with this disclosure in which resources may be shared with external devices. For instance, Personal Electronic Devices (PEDs), e.g., ruggedized PEDs or PEDs installed in environment-proof cases, may be appropriately carried in environments suitable for a wide range of weapon uses. It is understood that processing, display, and user interface functionality could be distributed between a weapon sight and a device interface to the weapon sight in a wired or wireless (Bluetooth, WiFi and the like) fashion. Such a distributed architecture may allow for a simple, less expensive, and/or lower power thermal weapon sight design.

Example Thermal Weapon Sight

FIG. 2 shows an example body of a thermal weapon sight 1. The thermal weapon sight 1 as shown is configured to mount to common weapon scope mounting hardware and is dimensioned accordingly, which may change in a known way depending on which mount standard is being met. The front of the weapon sight includes a lens 101, along with optional filters and protective elements, all of which may be selected to be transparent in all or part of the thermal wavelength band, including some or all of wavelengths from 6 up to 15 microns. The weapon sight 1 also may include a display 116 and controls, for example zoom controls, 122.

Figure 3:
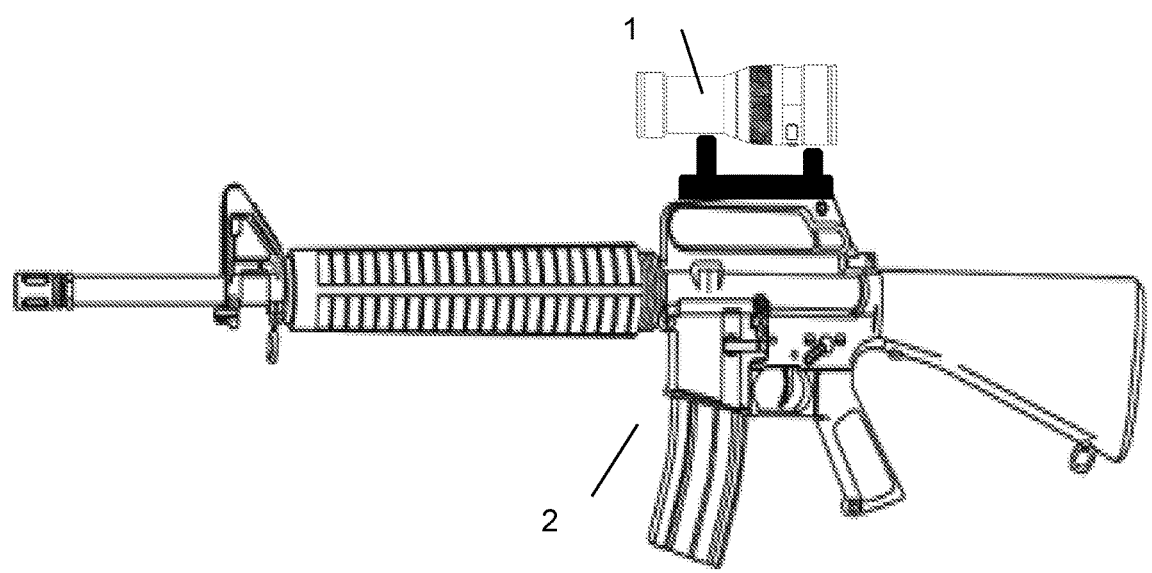
FIG. 3 illustrates a thermal weapon sight mounted on a weapon.

The methods and device elements disclosed herein apply to a thermal imager configured as a weapon sight, but it will be understood that the weapon sight can be completely functional as a thermal viewer whether or not it is mated to a weapon. Moreover, although some of the elements disclosed herein may be more closely applicable to a weapon sight application of a thermal viewer, the elements disclosed herein may apply to thermal viewers in general, and are applicable to thermal viewers not intended for or compatible with mating to a weapon. For the case which will be primarily discussed herein, e.g., as shown in FIG. 3, the thermal weapon sight 1 is mated to a weapon 2, which may be any type of weapon, such as a rifle, pistol, crossbow, or other weapon.

Figure 4:
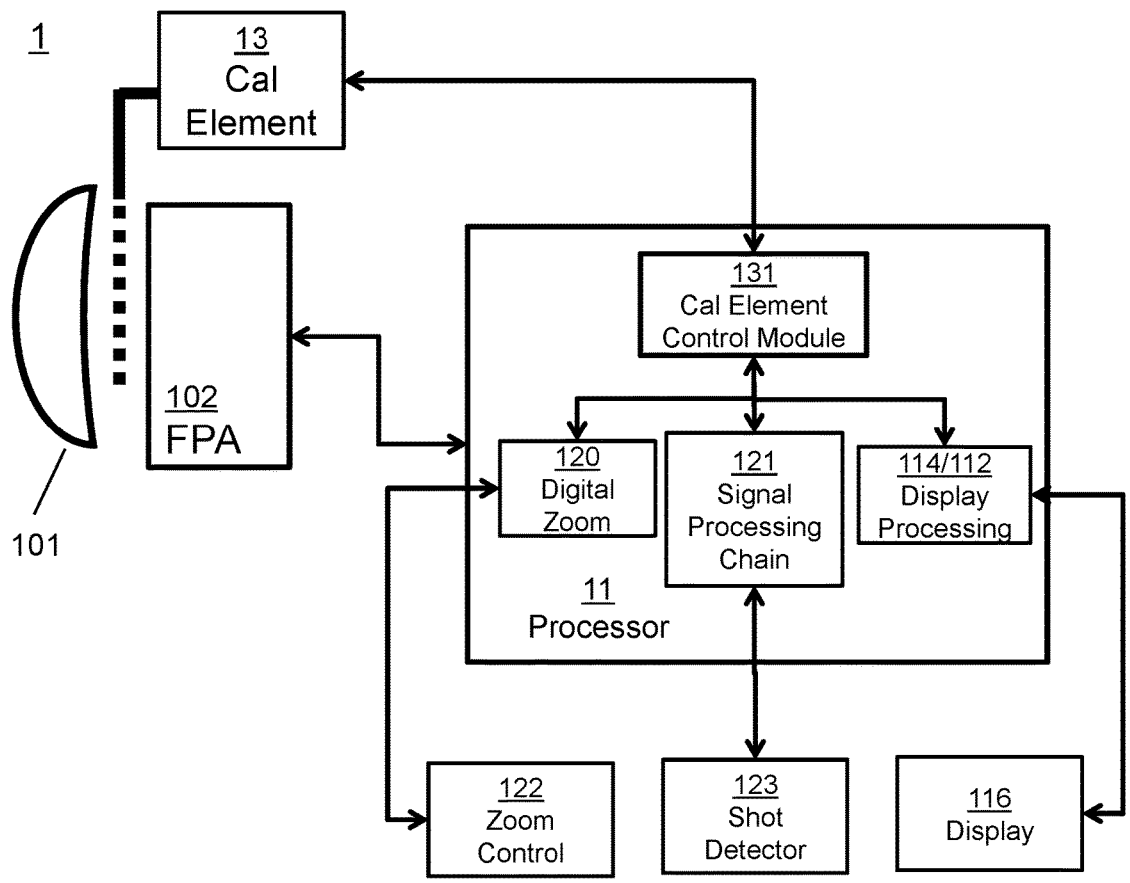
FIG. 4 is a block diagram of an example embodiment of a thermal weapon sight's system elements.

FIG. 4 is a block diagram showing the system elements of an example thermal weapon sight 1 suitable for implementing the novel aspects of the current disclosure. A lens 101 and/or other front end optics, transparent in at least the thermal wavelength band of interest, collects and directs radiation to FPA 102. An optional physical calibration element 13, such as a shutter or another type of known scene element, may be present for NUC operations. For some systems where NUC is accomplished without physical calibration, physical calibration elements may not be present. Weapon sight 1 usually will include a display 116 for allowing operator viewing of the scene imaged by the FPA 102. Weapon sight 1 may optionally also include for some embodiments operator zoom controls 122, such as buttons or the like on the body of the sight, and a shot detector 123. Shot detector 123 may be any device suitable for detecting the occurrence of the weapon firing. Such devices may include microphones, accelerometers, temperature sensors, motion sensors, or other devices capable of detecting conditions associated with weapon firing. Any of these sensor types may be operated in a mode, for example, to discriminate a high intensity, fast rise time signal due to a shot, from any other operational or non-operational signals. It is usually possible in thermal imaging systems of the type described to store some number of images as they are acquired. A running recording stream may be implemented, i.e. always keeping all or some of the images for a certain period of time, and dropping older image and storing new ones constantly to always have imaged from the latest predetermined time period stored. Upon detection of a shot, the recording stream may be stopped, and/or continued for a time beyond the shot. Thus images, video, and/or time lapse images can be stored from an interval prior to and/or after the shot and may be selected for display and to be available to the operator. These time interval records may be viewed on the device itself, and/or may be uploadable to other devices such as PEDs.

Weapon sight 1 also includes a processing element such as processor 11, which may be distributed across one or more physical processors of any suitable computing and/or logic design. The method aspects of the current disclosure can be implemented as program and/or logic steps executed on processor 11, for example, based on computer-executable instructions stored in a physical memory in communication with processor 11. Processor 11 can include some or all of the modules described above with reference to FIG. 1, as well as other modules as necessary. Processor 11 may include an optional physical calibration element control module 131, and display processing, including contrast equalization/enhancement, module 114/122. Processor 11 also includes a signal processing chain 121.

Processor 11 also includes a digital zoom module 120. Although weapon sight 1 may have optical zoom, a digital zoom function may be required or advantageous for some of the novel aspects disclosed herein. The digital zoom may operate in a normal fashion, by selecting a subset of the full pixel frame acquired by the FPA and expanding the subset to fill the display in response to operator control. Thus the magnification due to the digital zoom is purely digital, such that a subset of the acquired image pixels are mapped to the display pixels proportional to the degree of digital magnification (zoom) selected. In general if optical zoom is present, the digital zoom extends beyond the optical zoom selected, or beyond the basic magnification if no optical zoom is present. For the weapon sight application, it may be desirable for the digital zoom to be continuous with increments less than one. Digital zoom increments less than one may also be desirable for other thermal viewing applications besides weapon sights. It may also be desirable when digital zoom is engaged that the digital zoom starts at a predetermined level.

For an example embodiment, when digital zoom is actuated, the first digital zoom may be, for example, 1.5 and then extend higher from 1.5. In this example embodiment, weapon sight 1 has no optical zoom, and has two zoom controls 122 for "up" and "down". When "up" is actuated, as long as the operator keeps the up control actuated, the magnification jumps to 1.5 and continues up in magnification steps less than one until the operator stops the "up" actuation. When "down" is actuated, the magnification decreases in continuous steps less than one until 1.5 magnification is reached, at which point the digital zoom is turned off. It will be appreciated that the digital zoom functionality described herein can be implemented with a jump of greater or less than 0.5, such as a jump to 2.0, or other jump size, or may be implemented without an initial jump.

Figure 5A:
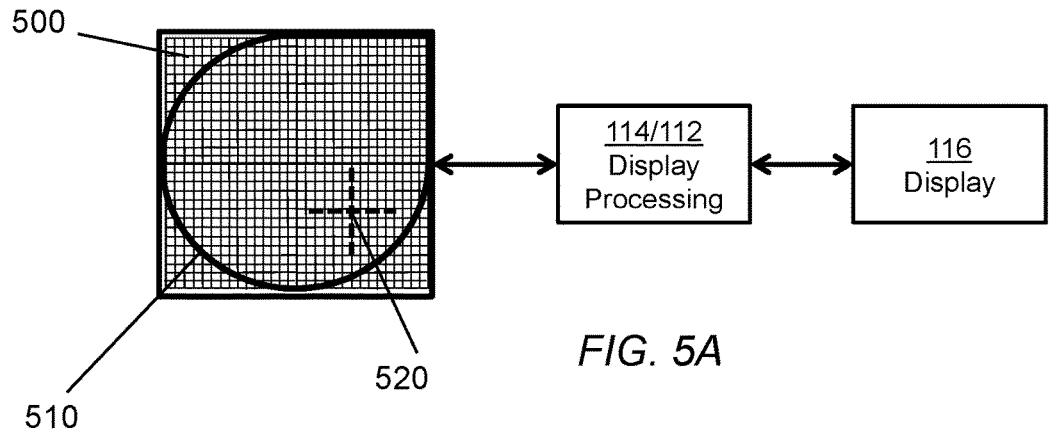
FIGS. 5A, 5B, and 5C illustrate example reticle centering and contrast localization embodiments.
Figure 5B:
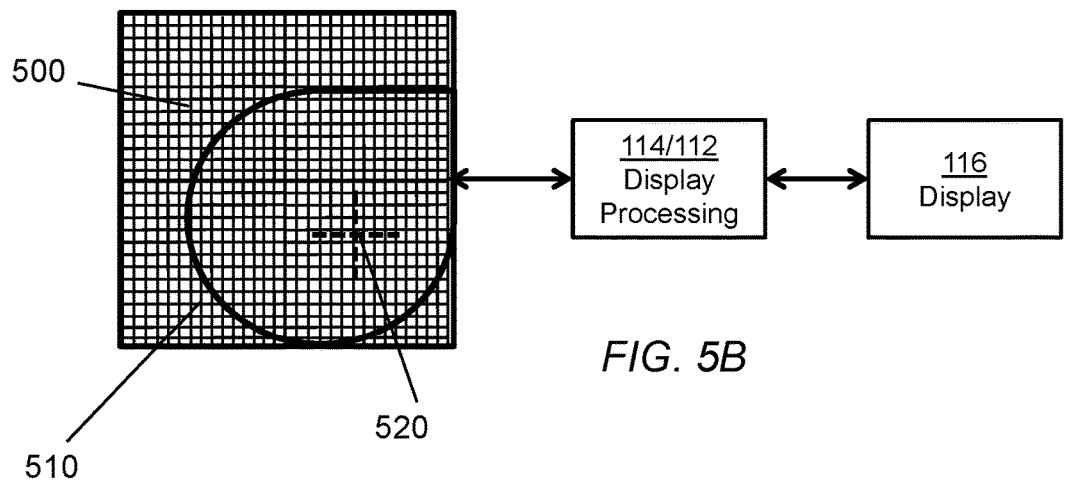
Figure 5C:
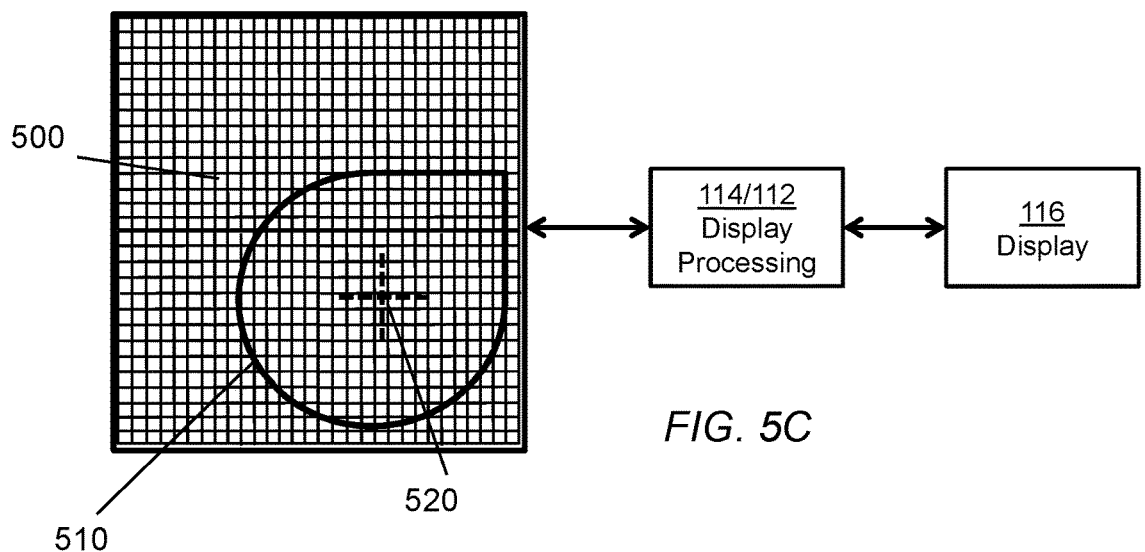

FIGS. 5A, 5B, and 5C illustrates additional novel operational features in the context of a digital zoom. FIG. 5A shows the pixels 500 from an image acquired from FPA 102 with no zoom. The image display at no zoom is shown as 510, which for a weapon sight may not be rectangular. In any case the mapping of image pixels to display pixels is based on a 1 to 1 magnification.

A weapon sight often includes a reticle 520 overlaid on the display 510. The reticle indicates to an operator the aiming point of the weapon relative to the displayed scene. For 1 to 1 magnification, the aiming point of the weapon does not necessarily correspond to the center of the image. This is due to a variety of causes, including, for example, unavoidable or difficult to avoid errors in the mounting of the sight relative to the firing axis of the weapon, and may include more complex variables such as firing velocity, windage and elevation effects. "Sighting in" or calibration of the reticle position is a known function that is used on most weapon sights, even simple ones such as purely optical telescopic sights.

In some embodiments, it may be preferable for the reticle to be as close to the center of the display as possible. Preferably, at zero magnification the display reticle position relative to the acquired FPA 500 image can be known. During digital zoom magnification, the reticle position relative to the acquired image 500 does not change. However the reticle position relative to the displayed image can change with no effect on operation as long as the reticle position relation to the acquired image, which corresponds to the fixed position of the sight relative to the weapon, is maintained.

This principle allows for improved position of the reticle in the display as digital zoom takes place. As shown in FIG. 5B as digital zoom magnification takes place the mapping of the acquired image 500 to displayed image 510 entails that fewer image pixels are displayed, and the displayed image 510 encompasses less of the acquired image 500. Thus the displayed reticle 520 position can be moved closer to the center of the display by choosing the mapping of what portion of the acquired image is displayed, without changing the reticle 520 position relative to the actual aiming point. As shown in FIG. 5C, once the magnification is sufficient, the displayed portion 520 of the acquired image 500 may be mapped such that the reticle 520 is centered in the display while maintaining all of the displayed image corresponding to pixels of the acquired image. For the example case above, where the digital zoom starts at 1.5, it is possible to center the reticle upon engaging the digital zoom.

Also shown in FIGS. 5A, 5B, and 5C is another operational improvement. As described in the incorporated references, the acquired image contrast levels are allocated to the lower number of display contrast levels using some sort of equalization or other contrast allocation method. This allows for an improved contrast enhancement result for digitally zoomed images. As seen in FIGS. 5A, 5B. and 5C, as digital zoom is increased fewer acquired pixels are displayed. Thus it is possible to apply the display processing 114/112, including the contrast equalization, to only those pixels which will be displayed on display 116. This results in allocating the available display contrast level among a smaller number of pixels corresponding to a smaller portion of the acquired scene. Often a subset of an image will have less temperature variation than the entire scene has. So applying the contrast equalization to just the pixels displayed results in contrast enhancement of the zoomed portion of the image. Applying contrast enhancement selectively is also a feature with general thermal viewer applicability, not just for weapon sights.

Figure 6A:
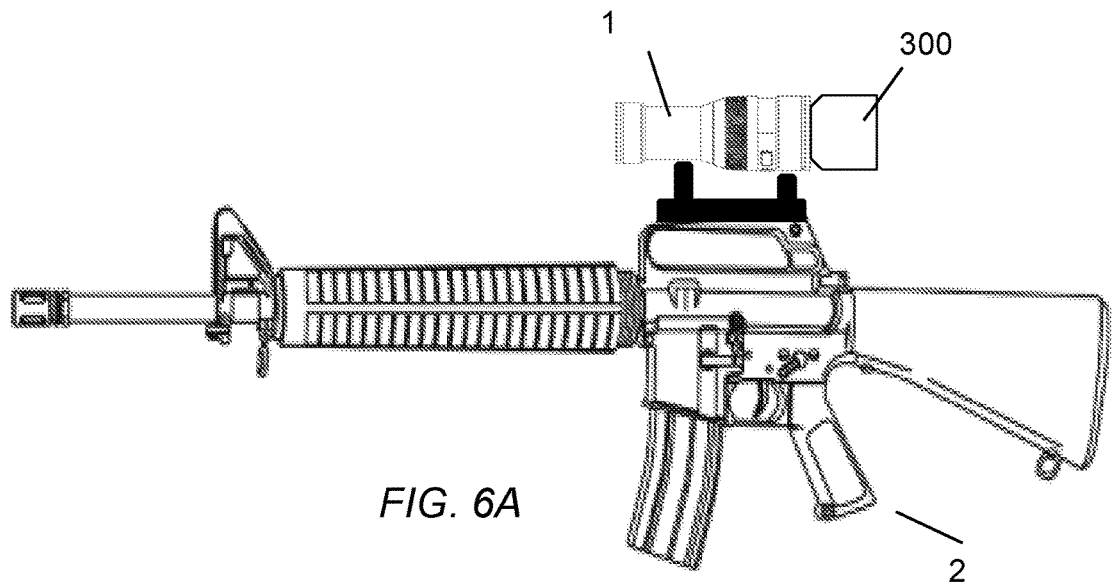
FIGS. 6A and 6B illustrate alternative weapon sight embodiments.
Figure 6B:
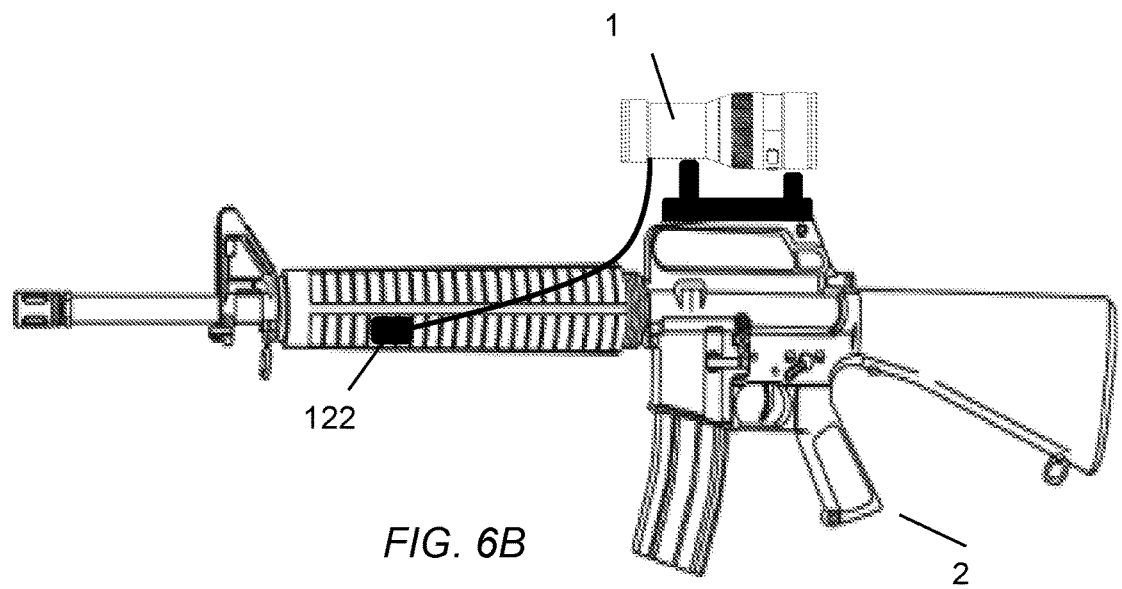

FIG. 6A shows an optional weapon sight 1 configuration. Weapon sight 1 may include a display, which may be a general purpose display configured to be viewed from a distance, for example, between a few inches and approximately one foot. However, some weapon operators may be used to operating a weapon by putting their eye up to an eyepiece of a telescopic sight. Thus it may be desirable to provide an optional, removable eyepiece adapter 300. An eyepiece adapter 300 may be fitted with an eye interface element (e.g., an eyecap or similar) such as eye interface elements found in binoculars or telescopes, with a lens that focuses the plane of the weapon sight display onto the operator's eye. Also, as shown in FIG. 6B for a weapon sight with zoom or other user controls, it may be desirable to operate the controls 122 without moving the hands from the firing position. Weapon sight controls 122 may be provided such that they can be attached to the weapon in a position where they can be actuated without moving hands from the firing position. Such controls can be wired to the weapon sight, or can be implemented as wireless controls via Bluetooth or other wireless communication protocol.

In some embodiments, a thermal weapon sight may be battery powered and may need to operate in harsh environmental conditions, such as cold weather, rain, snow, or the like. Often weapons may be operated with gloves on as well for many environments. Thus, it may be desirable to provide for easy battery access while maintaining environmental integrity. O-ring sealed screw connections and/or bayonet connections, with internally rotatable electrical connections are known to be environmentally rugged and are used in ruggedized flashlights and the like. However these connections may leave the battery hard to access, particularly for a gloved operator.

Figure 7A:
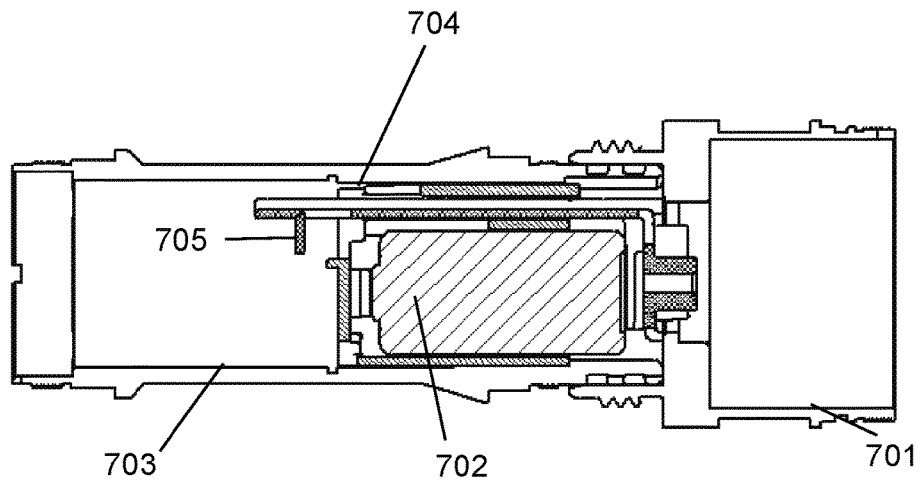
FIGS. 7A and 7B illustrate an example battery mounting embodiment.
Figure 7B:
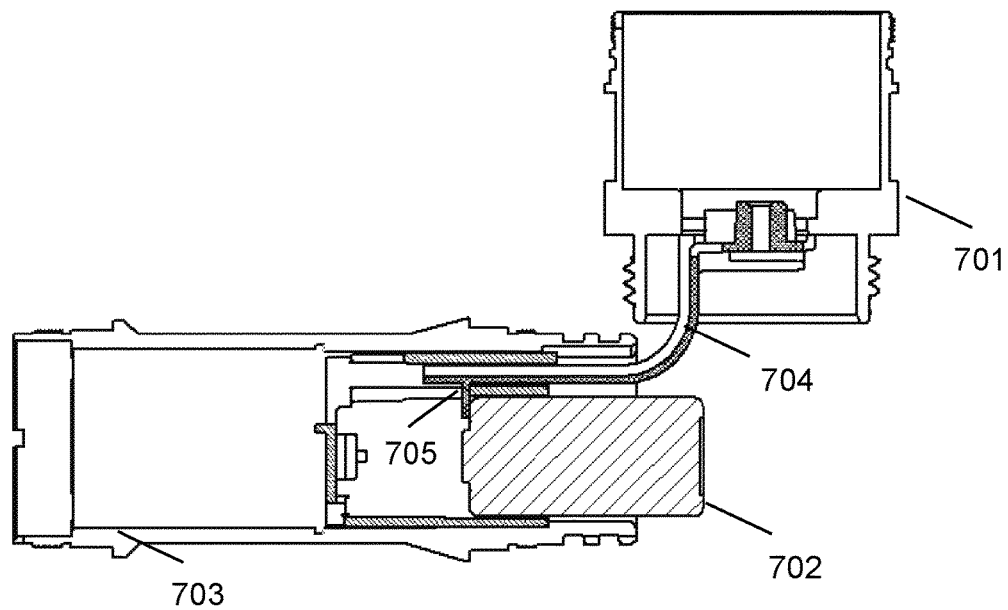

FIGS. 7A and 7B show improved battery access for a weapon sight. As shown in an assembled configuration in FIG. 7A, two sections 701, 703 of the sight are connected, by an o-ring sealed screw connection as shown, but other connection types such as sealed bayonet connections are possible. A battery 702 is held in place between sections 701 and 703. A flex cable 704 with a service loop connects from the rear of the battery 702 in section 703 to a rotatable connection to section 701. Ejector tab 705 is attached to cable 704 behind the battery 702.

FIG. 7B shows the sight in a disassembled configuration for battery insertion, removal, and/or replacement. Section 701 is disconnected from section 703 and pulled to the side. Cable 704 follows section 703 and ejector 705 moves with cable 704, thereby moving battery 702 partially out of section 703 such that the battery 702 can be easily removed by a gloved operator. In some embodiments, the flex cable 704 and ejector 705 can be at least partially enclosed within a track or other enclosure within section 703 such that the flex cable 704 and ejector 705 do not travel entirely out of section 703 when the sight is in a disassembled configuration. Thus battery 702 is easily accessible in an environmentally sound weapon sight enclosure.

Example Methods for Thermal Weapon Sight Operation

Figure 8:
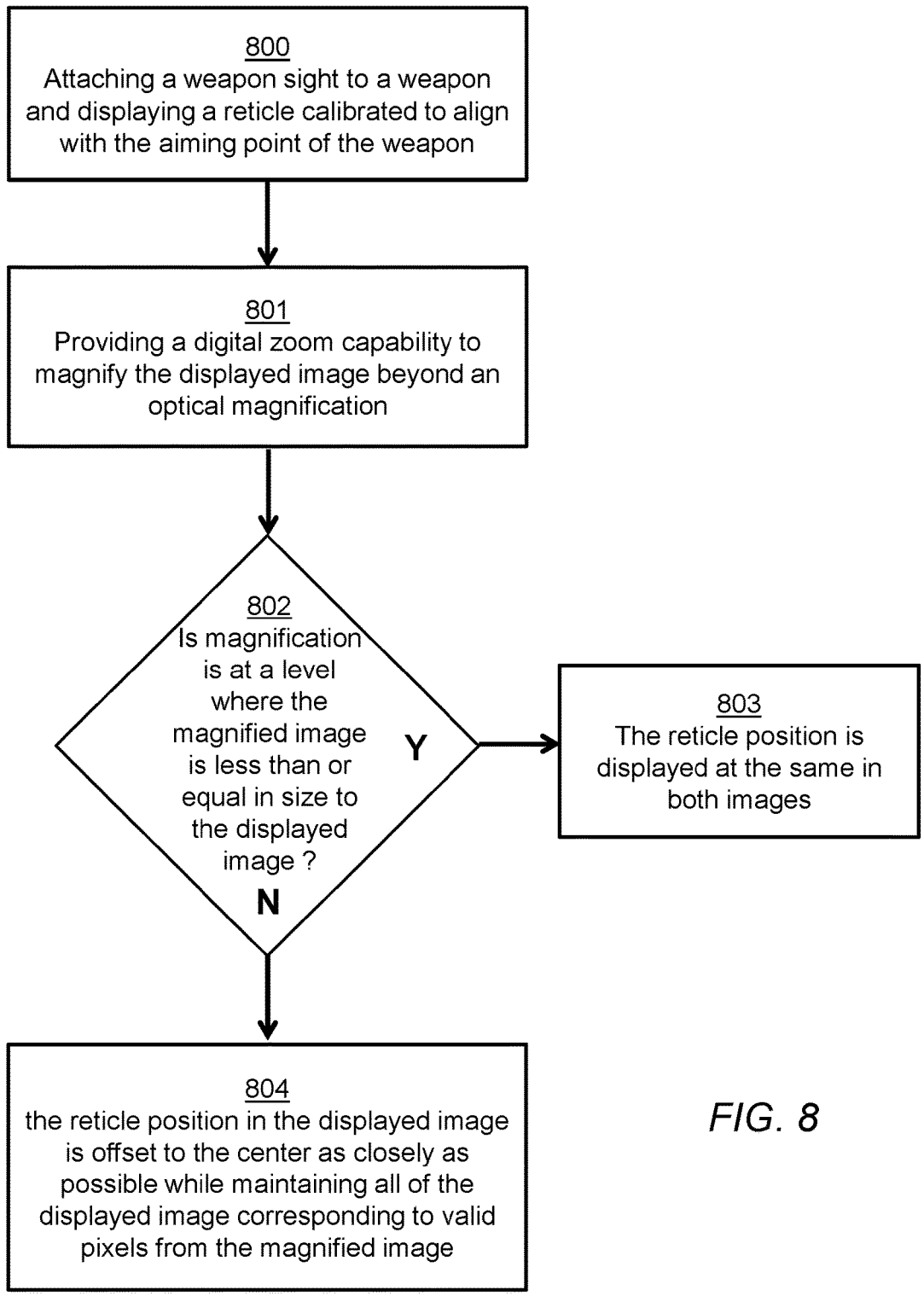
FIG. 8 is a flow chart illustrating an example method for reticle centering.

FIG. 8 is a flow chart illustrating an example method for operation of a thermal weapon sight. Step 800 is attaching a weapon sight to a weapon and displaying a reticle calibrated to align with the aiming point of the weapon. This step can include the "sighting in" or calibration of the sight to the weapon in terms of mounting and possibly weapon performance parameters. At zero zoom initial conditions, the reticle may or may not be centered in the weapon sight display. Step 801 is providing a digital zoom capability to magnify the displayed image beyond an optical magnification. Digital zoom entails mapping a smaller portion of the acquired image from the FPA onto the full area of the display according to a factor determined from user actuation of zoom controls.

In step 802 it is determined if the zoom magnification is at a level where the magnified image is less than or equal in size to the displayed image. In other words, at step 802 it is determined whether all of the acquired image pixels are mapped onto the displayed image pixels. If the answer is yes, the method continues to step 803, where the reticle position is displayed at the same or corresponding mapped point in both images. If the answer is no, the method continues to step 804, where the reticle position in the displayed image is offset to the center as closely as possible while preferably, although not necessarily, maintaining all of the displayed image pixels corresponding to valid pixels from the magnified image. In other words, as the displayed image corresponds to a smaller subset of the acquired image as magnification increases, it is possible to translate the reticle position toward the center of the displayed image without affecting the relation between the reticle and the aiming point of the weapon. At the magnification point where the reticle can be centered while maintaining all display pixels corresponding to acquired image pixels, the reticle can remain centered for that point of magnification and for any higher magnification.

Figure 9:
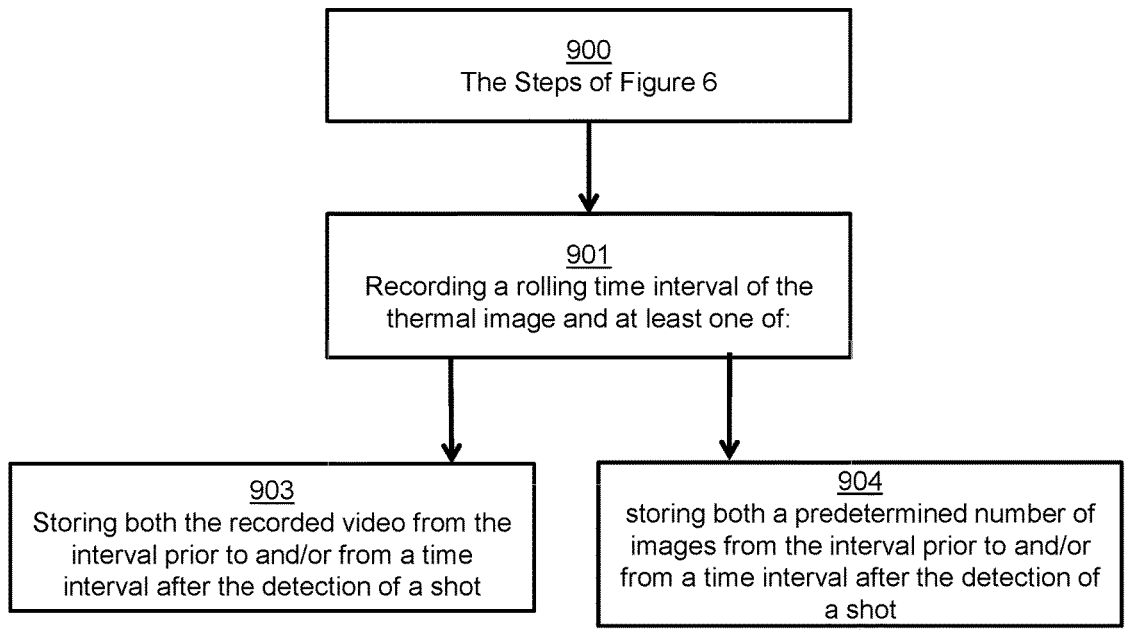
FIG. 9 is a flow chart illustrating an example method for shot recording.

FIG. 9 is a flow chart illustrating another example method for operation of a weapon sight with a shot detector. This method may be part of a weapon sight that operates using the method of FIG. 8, (step 900) or it may operate as an independent method. Step 901 is recording a rolling time interval of the thermal image. This may entail storing successive frames or some number of frames spanning a predetermined time interval and rolling this recording forward with time, and at least one of at least one of steps 903 and 904. Step 903 includes storing both the recorded video from the interval prior to and/or from a time interval after the detection of a shot. Step 904 includes storing both a predetermined number of images from the interval prior to and/or from a time interval after the detection of a shot. One or more of images, time lapse images, and/or a video stream from the stored interval may be available to the operator for after shot analysis, either on the device itself or uploaded to other devices such as smartphones, tablets, PCs, or any other computing/display devices.

Figure 10:
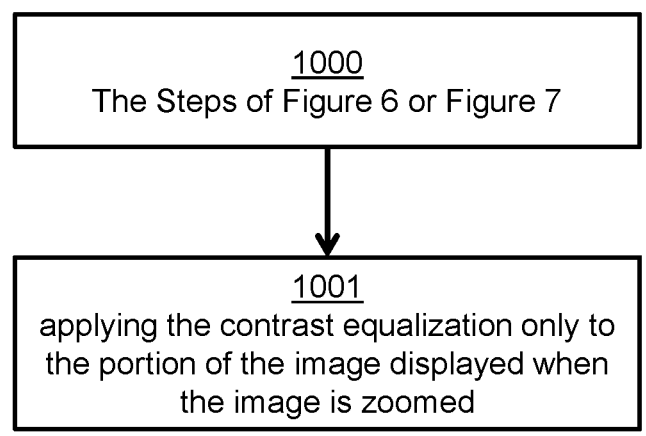
FIG. 10 is a flow chart illustrating an example method for localized contrast enhancement.

FIG. 10 is a flow chart illustrating another example method for operation of a weapon sight with digital zoom. This method may be part of a weapon sight that operates using the method of FIG. 8 or FIG. 9, (step 1000) or it may operate as an independent method. Step 1001 is applying the contrast equalization only to the portion of the image displayed when the image is zoomed. In other words, as the image is magnified, a smaller number of acquired image pixels are mapped onto the displayed pixels. Therefore, the contrast equalization need only be applied to the smaller number of acquired image pixels that correspond to displayed pixels. The remaining acquired image pixels that do not correspond to displayed pixels may be omitted from the contrast equalization processes described herein. Thus, the display contrast levels used for contrast equalization, which may be a fixed or capped number of contrast levels, may be allocated to a smaller number of pixels, which typically results in improved contrast enhancement for the displayed pixel set, relative to the contrast enhancement that would be achieved using the entire acquired pixel set. It will be appreciated that, in addition to contrast equalization and enhancement, other image processing functions described herein may similarly be applied selectively to the displayed pixels while not being applied to the acquired pixels that do not correspond to displayed pixels.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for displaying visual content in a weapon sight attached to a weapon, the weapon sight comprising a thermal imager with a processor executing an image processing chain including a contrast equalization element, and a display for displaying thermal images to a user of the weapon, the method comprising:

providing a reticle overlaid at a reticle location on the thermal image in the display, wherein the reticle location relative to the thermal image is determined based on an aiming point of the weapon;

providing a digital zoom capability to magnify the displayed image beyond an optical magnification;

applying a contrast equalization, by the contrast equalization element, only to the portion of the image displayed when the image is zoomed; and displaying the reticle at the reticle location in the display corresponding to the aiming point by at least one of:

when the magnification is at a level where the magnified image is less than or equal in size to the displayed image, the reticle location is the same in both images; and when the magnification is at a level where the magnified image is greater in size than the displayed image, the reticle location in the displayed image is offset to the center as closely as possible while maintaining all of the displayed image corresponding to valid pixels from the magnified image.

2. The method of claim 1, wherein the weapon sight comprises a shot indicator, comprising;

recording at least one of video and images over a rolling time interval of the thermal image and at least one of:

storing the recorded video from the interval at least one of prior to and after the detection of a shot; and storing a predetermined number of images from the interval at least one of prior to and after the detection of a shot; and displaying at least one of a video, a series of images, or a time lapse video at a user command.

3. The method of claim 1, wherein the zoom levels are 1 to 1 at no zoom, 1 to a predetermined limit of optical zoom, and continuous digital zoom to a predetermined limit past the optical zoom limit.

4. The method of claim 1 wherein the continuous digital zoom starts at 1.5 and the reticle position is centered in the displayed image for all values of digital zoom.

5. The method of claim 1 wherein the digital zoom increments in magnifying steps of less than 1 to 1.

6. The method of claim 1 wherein the weapon sight further comprises an eyepiece configured to enable viewing of the display by a user with an eye in contact with or in close proximity to the eyepiece.

7. The method of claim 1, wherein the weapon sight comprises mating sections and a battery holder configured to release a battery when the sections are un-mated.

8. The method of claim 1 wherein the weapon sight further comprises a digital zoom control disposable on the weapon configured to allow operation of the weapon and the zoom without changing user hand position.

9. The method of claim 1, wherein the thermal imager is a room temperature device comprising a focal plane array comprising an array of microbolometer detectors and read-out electronics.

10. A weapon sight comprising a thermal imager with a processor executing an image processing chain and a display for displaying thermal images to a user of the weapon, the weapon sight further comprising mating sections and a battery holder configured to release a battery when the sections are un-mated, the weapon sight configured to, when attached to a weapon:

provide a reticle overlaid at a reticle location on the thermal image in the display, wherein the reticle location relative to the thermal image is determined based on an aiming point of the weapon;

provide a digital zoom capability to magnify the displayed image beyond an optical magnification; and display the reticle at a position in the display corresponding to the aiming point by at least one of:

when the magnification is at a level where the magnified image is less than or equal in size to the displayed image, the reticle position is the same in both images; and when the magnification is at a level where the magnified image is greater in size than the displayed image, the reticle position in the displayed image is offset to the center as closely as possible while maintaining all of the displayed image corresponding to valid pixels from the magnified image.

11. The weapon sight of claim 10, further comprising a shot indicator, wherein the weapon sight is further configured to:

record at least one of video and images over a rolling time interval of the thermal image and at least one of:

store the recorded video from the interval at least one of prior to the detection of a shot and after the detection of a shot, and;

store a predetermined number of images from the interval at least one of prior to the detection of a shot and after the detection of a shot, and;

display at least one of a video, a series of images, or a time lapse video at a user command.

12. The weapon sight of claim 10, wherein the zoom levels are 1 to 1 at no zoom, 1 to a predetermined limit of optical zoom, and continuous digital zoom to a predetermined limit past the optical zoom limit.

13. The weapon sight of claim 10 wherein the continuous digital zoom starts at 1.5 and the reticle position is centered in the displayed image for all values of the continuous digital zoom.

14. The weapon sight of claim 10 wherein the digital zoom increments in magnifying steps of less than 1 to 1.

15. The weapon sight of claim 10 wherein the image processing chain includes a contrast equalization element and the weapon sight is further configured to apply the contrast equalization only to the portion of the image displayed when the image is zoomed.

16. The weapon sight of claim 10 wherein the weapon sight further comprises an eyepiece configured to enable viewing of the display by a user with an eye in contact with or in close proximity to the eyepiece.

17. The weapon sight of claim 10 wherein the weapon sight further comprises a digital zoom control disposable on the weapon configured to allow operation of the weapon and the zoom without changing user hand position.

18. The weapon sight of claim 10, wherein the thermal imager is a room temperature device comprising a focal plane array comprising an array of microbolometer detectors and read-out electronics.

19. A method for displaying visual content in a weapon sight attached to a weapon, the weapon sight comprising a thermal imager with a processor executing an image processing chain, a display for displaying thermal images to a user of the weapon, and a shot indicator, the method comprising:

providing a reticle overlaid at a reticle location on the thermal image in the display, wherein the reticle location relative to the thermal image is determined based on an aiming point of the weapon;

providing a digital zoom capability to magnify the displayed image beyond an optical magnification;

displaying the reticle at the reticle location in the display corresponding to the aiming point by at least one of:

when the magnification is at a level where the magnified image is less than or equal in size to the displayed image, the reticle location is the same in both images; and when the magnification is at a level where the magnified image is greater in size than the displayed image, the reticle location in the displayed image is offset to the center as closely as possible while maintaining all of the displayed image corresponding to valid pixels from the magnified image;

recording at least one of video and images over a rolling time interval of the thermal image and at least one of:

storing the recorded video from the interval at least one of prior to and after a detection of a shot; and storing a predetermined number of images from the interval at least one of prior to and after the detection of a shot; and displaying at least one of a video, a series of images, or a time lapse video at a user command.

* * * * *